(12) United States Patent
Heilig

(10) Patent No.: US 7,832,919 B2
(45) Date of Patent: Nov. 16, 2010

(54) GEAR TRAIN FOR DRIVING A MIXER DRUM MOUNTED ON A VEHICLE

(75) Inventor: Eduard Heilig, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 757 days.

(21) Appl. No.: 11/658,978

(22) PCT Filed: Aug. 8, 2005

(86) PCT No.: PCT/EP2005/008587

§ 371 (c)(1),
(2), (4) Date: Jan. 30, 2007

(87) PCT Pub. No.: WO2006/015838

PCT Pub. Date: Feb. 16, 2006

(65) Prior Publication Data

US 2008/0318722 A1 Dec. 25, 2008

(30) Foreign Application Priority Data

Aug. 7, 2004 (DE) ................ 10 2004 038 506

(51) Int. Cl.
*B28C 5/42* (2006.01)

(52) U.S. Cl. .................. 366/61; 475/83

(58) Field of Classification Search ............ 366/53–63, 366/232–233; 475/82, 83

See application file for complete search history.

(56) References Cited

U.S. PATENT DOCUMENTS

| | | | |
|---|---|---|---|
| 186,570 A | 1/1877 | Huffman | |
| 2,265,053 A | 12/1941 | Anderson | |
| 2,511,240 A | 6/1950 | Bohmer et al. | |
| 2,895,722 A | 7/1959 | Hunkins | |
| 3,658,303 A | 4/1972 | Funk | |
| 3,756,572 A | 9/1973 | Buelow et al. | |
| 3,785,622 A | 1/1974 | Johnson | |
| 3,825,232 A | 7/1974 | Pecorari | |
| 4,378,163 A | 3/1983 | Jameson et al. | |
| 4,425,813 A | 1/1984 | Wadensten | |
| 4,453,830 A | 6/1984 | Jameson et al. | |
| 4,575,254 A | 3/1986 | Johnston | |
| 5,149,126 A | 9/1992 | Brennan | |
| 5,820,258 A | 10/1998 | Braun | |
| 6,569,047 B2 | 5/2003 | Grauby et al. | |
| 6,689,160 B1 | 2/2004 | Okuda et al. | |
| 7,008,343 B2 * | 3/2006 | Nagasugi et al. | 475/83 |
| 7,331,701 B2 * | 2/2008 | Heilig et al. | 366/63 |
| 2006/0176133 A1 * | 8/2006 | Heilig et al. | 336/62 |
| 2008/0291772 A1 * | 11/2008 | Mollhagen | 366/63 |
| 2008/0318722 A1 * | 12/2008 | Heilig | 475/83 |

(Continued)

FOREIGN PATENT DOCUMENTS

AT 327 693 2/1976

(Continued)

*Primary Examiner*—Charles E Cooley
(74) *Attorney, Agent, or Firm*—Davis & Bujold, P.L.L.C.

(57) ABSTRACT

A gear for driving a drum of a ready-mix concrete truck comprises a driving motor (5) which drives an inner spider gear (7) of a planetary gear. An outer spider gear (16) forms the driven part and a bearing (11), by which the drum of the concrete truck is mounted, is disposed between a planetary gear (23) and the driving motor (5).

9 Claims, 1 Drawing Sheet

U.S. PATENT DOCUMENTS

2009/0034363 A1 * 2/2009 Frondorf et al. .............. 366/232

FOREIGN PATENT DOCUMENTS

| | | | |
|---|---|---|---|
| DE | 1 182 125 | | 11/1964 |
| DE | 23 41 250 | | 2/1975 |
| DE | 31 21 797 | A1 | 12/1982 |
| DE | 3121797 | A1 * | 12/1982 |
| DE | 42 43 447 | A1 | 6/1994 |
| DE | 195 37 462 | A1 | 4/1997 |
| DE | 196 12 309 | A1 | 10/1997 |
| DE | 100 33 661 | A1 | 1/2002 |
| DE | 20 2004 020 370 | U1 | 6/2005 |
| EP | 931932 | A2 * | 7/1999 |
| EP | 1 186 309 | A2 | 3/2002 |
| EP | 1 186 390 | A2 | 3/2002 |
| EP | 1 186 802 | A1 | 3/2002 |
| EP | 1875998 | A2 * | 1/2008 |
| FR | 2.146.053 | | 2/1973 |
| FR | 2.221.029 | | 10/1974 |
| GB | 543123 | | 2/1942 |
| GB | 668010 | | 3/1952 |
| JP | 56-10848 | | 2/1981 |
| JP | 2000233677 | A * | 8/2000 |
| SU | 1364486 | A1 | 1/1988 |
| WO | WO 9423918 | A1 * | 10/1994 |
| WO | WO 00/01518 | A1 * | 1/2000 |
| WO | WO-2006/015832 | A1 | 2/2006 |
| WO | WO-2006/015833 | A1 | 2/2006 |
| WO | WO-2006/015835 | A1 | 2/2006 |
| WO | WO-2006/015839 | A1 | 2/2006 |
| WO | WO 2006015837 | A1 * | 2/2006 |
| WO | WO 2006015838 | A1 * | 2/2006 |
| WO | WO-2006/131335 | A2 | 12/2006 |

* cited by examiner

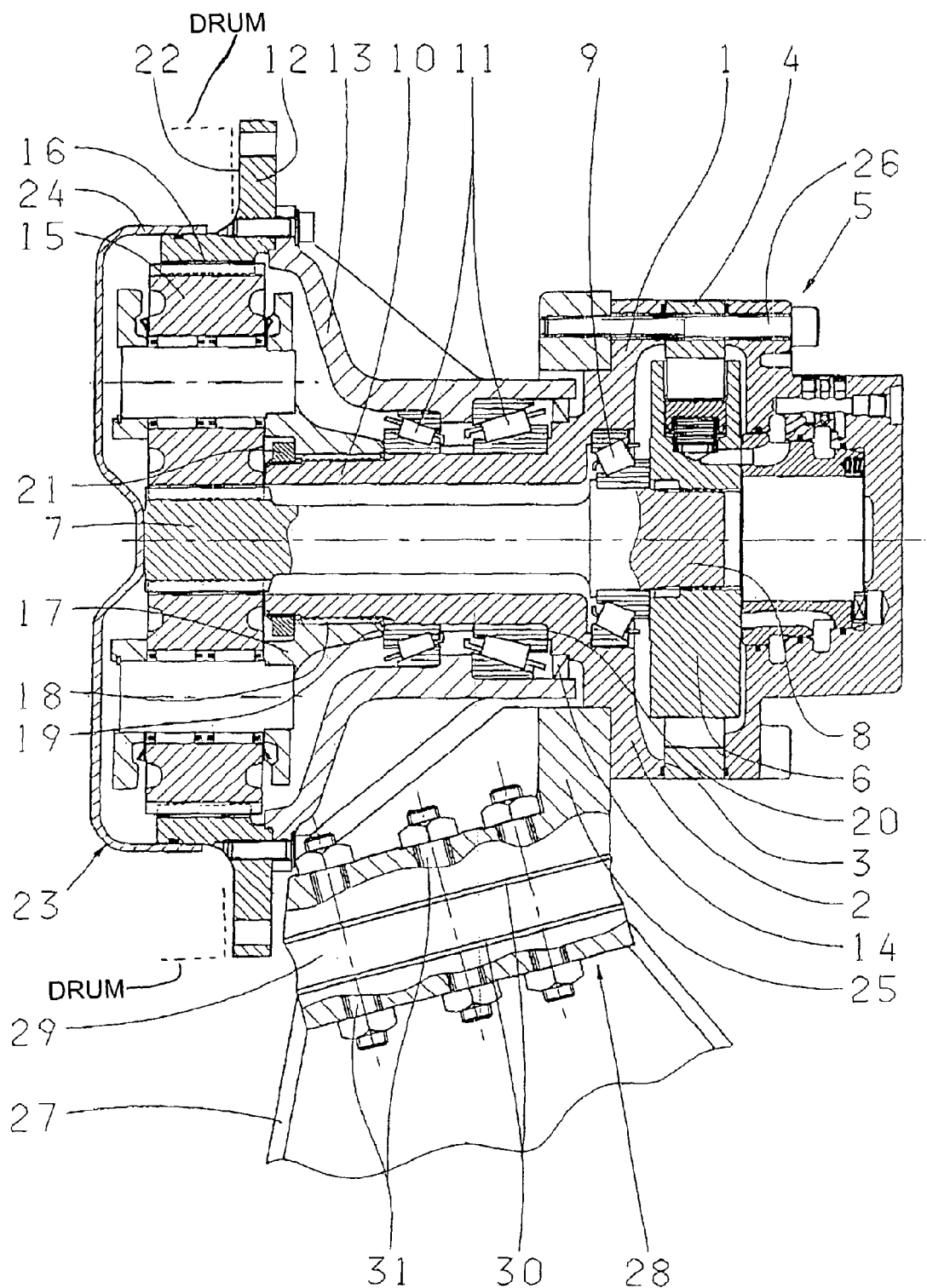

GEAR TRAIN FOR DRIVING A MIXER DRUM MOUNTED ON A VEHICLE

This application is a national stage completion of PCT/EP2005/008587 filed Aug. 8, 2005, which claims priority from German Application Serial No. 10 2004 038 506.8 filed Aug. 7, 2004.

FIELD OF THE INVENTION

The present invention relates to a gear, suitable for driving a drum of a ready-mix concrete truck.

BACKGROUND OF THE INVENTION

Gears for driving a drum of a ready-mix concrete truck are used to set the drum of the concrete truck in rotation and retract it during rotation; to facilitate filling of the drum; to empty it during rotation, and to transport the ready-mix concrete in the drum, for example, out of the drum. In addition to providing the torque to the drum required for setting it in rotation, the gear's function is to absorb the weight of the drum and the content thereof. In addition, the gear must compensate for relative motion between the drum and the frame of the vehicle, which motions occur when the drum is loaded and the vehicle travels on uneven terrain, for example. For this purpose, the gear is mounted on a base which is connected to the vehicle frame and is flanged to the drum. The gear must have a compact design since only a small installation space is available between the drum and the driver's cab of the vehicle.

EP 1 186 390 B1 discloses a gear for a drive mechanism of a mixing drum, wherein a hydraulic motor is connected directly to a planet carrier of a planetary gear, on the one hand, and to a stationary housing part, on the other hand. The rotary cylinder of the hydraulic motor drives an inner spider gear of the planetary gear, the outer spider gear of which forms the driven part and is connected to the mixing drum. The mixing drum is mounted in the gear with a bearing, which is disposed on the stationary housing and can be, therefore, configured only with a large diameter which results in high costs.

It is, therefore, the object of the present invention to create a compact gear for driving a mixing drum, which gear is characterized by an inexpensive mount.

SUMMARY OF THE INVENTION

A radial piston motor, according to the invention, drives an inner spider gear of a planetary gear, the outer spider gear of which forms the driven part and is connected to a driven flange or is configured as one piece therewith, and the planet carriers of which are non-rotatably connected to a stationary housing part, to which the cam disk of the hydraulic motor is connected. The mount of the driven flange is disposed between the planet carrier and the cam disk of the hydraulic motor. This way, it is possible to select the diameter of this mount such that inexpensive bearings can be used. It is preferable if tapered roller bearings are used; however, it is also possible to use other bearings, for example, thrust roller bearings, in conjunction with radial roller bearings, barrel-shaped bearings or grooved ball bearings, as well as sliding bearings.

In a further embodiment of the invention, the stationary housing part has a flange to which the cam disk of the hydraulic motor is flanged and a journal, which is connected to the planet carrier and on which the inner raceways of the bearing are provided.

In a further embodiment, the planet carrier is connected to the journal via a synchronization gearing mechanism. The planet carrier is configured such that the gearing mechanism is disposed in a bore of the planet carrier. The axial fixation of at least one inner raceway of the bearing may be achieved by way of an abutment surface on the planet carrier and an abutment surface on the stationary housing part, wherein the planet carrier is connected to the stationary housing part by axial connecting elements, such as a grooved nut.

In a further embodiment of the invention, the planet carrier is disposed in a bore of the stationary housing part by way of a synchronization gearing mechanism and is connected thereto. It is possible to provide the bearing on the planet carrier and/or the journal of the same.

In a further embodiment of the invention, the planet carrier is connected to the stationary housing part using a locating pin connection and is secured in the axial direction with connecting elements, for example, screws. The bearing may be provided either on the stationary housing part, the planet carrier, or both, in order to achieve a centering effect.

In a further embodiment of the invention, the rotary cylinder of the hydraulic motor is supported in the stationary housing part in the axial direction by a bearing, wherein the bearing may be configured as a sliding or roller bearing.

In a further embodiment of the invention, the housing in which the planetary gear is provided and the hydraulic motor form a common pressurizing medium reservoir, which supplies the gearing components and the hydraulic motor with lubricant. It is also possible, however, to provide a sealing element between the stationary housing part and the inner spider gear, which element allows the planetary gear and the hydraulic motor to be operated with separate oil systems. By flanging the outer cam disk to the flange of the stationary housing part, standard hydraulic motors can be used and they can be flanged to the gear housing part. In a further embodiment, the stationary housing part is connected to a base or is configured as one piece with the same, which is connected to the vehicle frame by connecting elements and a bracket.

In a further embodiment of the invention, an elastic connecting element is provided between the base and the bracket, which element makes it possible to compensate for relative motion of the vehicle frame in relation to the mixing drum. It is preferable if this elastic element is made of an elastic center part which is connected to a metal support plate that is joined by connecting elements, such as screws or threaded pins, on the one hand, and to the base of the housing, on the other hand.

As a result of the gear arrangement, it is possible to create an axially short gear, which is characterized by an inexpensive bearing in that the bearing is disposed between the planetary gear and the hydraulic motor and in that the compensation for the relative motion between the vehicle frame and the mixing drum is achieved using an elastic element so that the bearing must only allow a rotational movement, but not the compensation between the drum and the vehicle frame.

BRIEF DESCRIPTION OF THE DRAWING

The invention will now be described, by way of example, with reference to the accompanying drawing in which:

The sole FIGURE shows a gear for driving a drum of a ready-mix concrete truck.

DETAILED DESCRIPTION OF THE INVENTION

The sole FIGURE shows a gear for driving a drum (DRUM) of a ready-mix concrete truck, wherein the stationary housing part 1 has a flange 2, against a flange surface 3 of which a cam disk 4 of a hydraulic radial piston motor 5 rests. The radial piston motor 5 may be a standard radial piston motor supported within the housing part 1 and which is flanged to the flange surface 3. A rotary cylinder 6 of the radial piston motor 5 drives an inner spider gear 7, which may have a multi-part configuration or be directly connected as one piece to a drive shaft 8. The rotary cylinder 6 is mounted on the stationary housing part 1, in an axial direction, by a motor bearing 9. The stationary housing part 1 comprises a journal 10, on which mounting bearings 11 are provided, thus mounting a driven flange 12, which is connected to the drum of the ready-mix concrete truck by a rotatable housing part 13. The bearings 11 are supported on the journal 10 at an axial location that is axially offset from the driven flange 12. A sealing element 14, which seals the two parts in a leak-proof manner in relation to each other, is provided between the rotatable housing part 13 and the stationary housing part 1. The inner spider gear 7 drives an outer spider gear 16 via planet wheels 15, which outer spider gear is connected to the driven flange 12 or is configured as one piece with the same. The planet wheels 15 are mounted on a planet carrier 17, which is at least non-rotatably directly connected to the stationary housing part 1. For this purpose, the planet carrier is provided with a bore 18 in which a spline gearing mechanism is disposed, which interacts with a spline gearing mechanism on the journal 10. The bearings 11 are stopped in the axial direction, via an abutment surface 19, an abutment surface 20 and a grooved nut 21. The driven flange 12 rests with an abutment surface 22 against the mixing drum (not shown), wherein the abutment surface 22 is located in the region of the only planetary gear 23. A thin-walled housing part 24 closes in a leak-proof manner, the space in which the planetary gear is located and, at the same time, serves as the axial abutment surface for the inner spider gear 7. A base 25 is connected to the stationary housing part 1, via connecting elements 26 or it may also be configured as one piece with the stationary housing part 1. It is also possible to connect the radial piston motor 5, the stationary housing part 1 and the base 25 to each other using common connecting elements. The base 25 is connected to a bracket 27, which is connected to the frame of the vehicle, wherein an elastic compensating element 28 is disposed between the base 25 and the bracket 27, which element allows relative movement of the drum in relation to the vehicle frame. The elastic compensating element 28 has an elastic core 29, which is connected to a metal plate 30, which, in turn, is connected to the base 25 by connecting elements 31, on the one hand, and to the bracket 27, on the other hand.

REFERENCE NUMERALS 1 stationary housing part
2 flange
3 flange surface
4 cam disk
5 radial piston motor
6 rotary cylinder
7 inner spider gear
8 drive shaft
9 bearing
10 journal
11 bearing
12 driven flange
13 rotatable housing part
14 sealing element
15 planet wheels
16 outer spider gear
17 planet carrier
18 bore
19 abutment surface
20 abutment surface
21 grooved nut
22 abutment surface
23 planetary gear
24 housing part
25 base
26 connecting element
27 bracket
28 elastic compensating element
29 elastic core
30 metal plate
31 connecting elements

The invention claimed is:

1. A gear for driving a drum of a ready-mix concrete truck, the gear comprising:
a driven flange (12) for connection to the drum;
a stationary housing (1) for connection to a frame of the truck;
a motor (5) axially supported within the stationary housing (1) by a motor bearing (9); and
only one single-stage planetary gear (23) including:
a single inner spider gear (7) driving a single outer spider gear (16) of the planetary gear (23) via a plurality of planet wheels (15) mounted on a single planet carrier (17) of the planetary gear (23);
the planet carrier (17) being directly connected to the stationary housing (1);
the motor (5) being connected to and directly driving the single inner spider gear (7) via an internal bore (18) of the single planet carrier (17);
the single outer spider gear (16) being coupled to the driven flange (12) for rotationally driving the driven flange (12); and
the driven flange (12) being rotationally mounted on a mounting bearing (11) located between the driven flange (12) and the motor (5).

2. The gear according to claim 1, wherein the stationary housing part has a flange (2) to which a earn disk (4) of the driving motor (5) is connected.

3. The gear according to claim 2, wherein the mounting bearing (11) is disposed on a journal (10) of the housing (1) and the planet carrier (17) is connected to the journal (10), and the mounting bearing (11) is axially confined between the planet carrier (17) and a housing flange (2).

4. The gear according to claim 3, wherein the journal (10) supports the mounting bearing 3, for the at an axial location that is axially offset from the driven flange (12).

5. The gear according to claim 2, wherein the motor bearing (9) is supported on a housing flange (2) for absorbing the axial forces of the driving motor (5).

6. The gear according to claim 1, wherein the driven flange (12) is connected to the drum of the truck by a flange surface (22) of driven flange (12).

7. The gear according to claim 1, wherein the housing (1) is one of connected to a base (25) and formed as one piece with the base (25), and the base (25) is connected to the vehicle frame by a flexible element (28).

8. The gear according to claim 7, wherein the mounting bearing (11), by which the driven flange (12) is rotatably mounted, is a tapered roller bearing and the flexible element (28) compensates for relative movement between the vehicle frame and the drum.

9. A gear for driving a drum of a ready-mix concrete truck, the gear comprising:
a housing (1) being fixed to a frame of the truck;
a driven flange (12) being connected to the drum and rotationally supported on the housing (1) by bearings (11);
a motor (5) comprising a drive shaft (8), the motor (5) and the drive shaft (8) being supported within the housing (1) by a motor bearing (9), the motor (5) rotationally driving the driven flange (12) via the drive shaft (8) and only one planetary gear set (23);
the planetary gear set (23) comprising a single inner spider gear (7) that is integral with the drive shaft (8), the inner spider gear (7) engaging and driving a plurality of planet wheels (15) that are rotatably supported by a planet carrier (18) which is rotationally fixed to the housing (1), the plurality of planet wheels (15) engage and drive an outer spider gear (16) which is integral with the driven flange (12); and
the bearings (11) being supported by the housing (1) at a location that is axially offset from the flange (12) and axially between the flange (12) and the motor (5).

* * * * *